US010474024B2

(12) United States Patent
Mathieson et al.

(10) Patent No.: US 10,474,024 B2
(45) Date of Patent: Nov. 12, 2019

(54) FOLDING PROJECTION SCREEN

(71) Applicant: Milestone AV Technologies LLC, Eden Prairie, MN (US)

(72) Inventors: Christopher Mathieson, Culver, IN (US); Jeremy Nyikos, Warsaw, IN (US)

(73) Assignee: Legrand A.V. Inc., Eden Prairie, MN (US)

( * ) Notice: Subject to any disclaimer, the term of this patent is extended or adjusted under 35 U.S.C. 154(b) by 0 days.

(21) Appl. No.: 16/077,306

(22) PCT Filed: Feb. 13, 2017

(86) PCT No.: PCT/US2017/017738
§ 371 (c)(1),
(2) Date: Aug. 10, 2018

(87) PCT Pub. No.: WO2017/139804
PCT Pub. Date: Aug. 17, 2017

(65) Prior Publication Data
US 2019/0049834 A1    Feb. 14, 2019

Related U.S. Application Data

(60) Provisional application No. 62/294,260, filed on Feb. 11, 2016.

(51) Int. Cl.
| G03B 21/58 | (2014.01) |
| H04M 1/02 | (2006.01) |
| G03B 21/56 | (2006.01) |
| G03B 21/30 | (2006.01) |
| G03B 21/60 | (2014.01) |
| G09F 1/12 | (2006.01) |

(52) U.S. Cl.
CPC ............. *G03B 21/58* (2013.01); *G03B 21/30* (2013.01); *G03B 21/56* (2013.01); *G03B 21/60* (2013.01); *G09F 1/12* (2013.01); *H04M 1/0268* (2013.01)

(58) Field of Classification Search
CPC ...................................................... G03B 21/30
USPC ............................................................ 359/461
See application file for complete search history.

(56) References Cited

U.S. PATENT DOCUMENTS

| 1,758,720 A | 5/1930 | Sodergren |
| 3,552,476 A | 1/1971 | Le Tarte |
| 3,914,887 A | 10/1975 | Newman |
| 5,113,611 A | 5/1992 | Rosson |

(Continued)

FOREIGN PATENT DOCUMENTS

| KR | 20-0426756 Y1 | 9/2006 |
| KR | 200426756 * | 9/2006 ............. G03B 21/56 |

OTHER PUBLICATIONS

International Preliminary Report on Patentability for Application No. PCT/US2017/017738, dated Aug. 23, 2018 (10 pgs).

(Continued)

*Primary Examiner* — Clayton E. LaBalle
*Assistant Examiner* — Kevin C Butler
(74) *Attorney, Agent, or Firm* — Patterson Thuente Pedersen, P.A.

(57) ABSTRACT

A portable display screen that can be broken down into components for easy transport and storage, while also being relatively easy to assemble into a self-supporting display screen with a flat surface without distracting wrinkles or other defects.

15 Claims, 22 Drawing Sheets

(56) References Cited

U.S. PATENT DOCUMENTS

| | | | |
|---|---|---|---|
| 5,737,893 A | 4/1998 | Rossiter et al. | |
| 2005/0270497 A1* | 12/2005 | Kepley, Jr. | G03B 23/08 353/79 |
| 2007/0121206 A1* | 5/2007 | Liang | G03B 21/56 359/443 |
| 2009/0007473 A1 | 1/2009 | Gimpel et al. | |
| 2010/0238544 A1 | 9/2010 | Elliott et al. | |
| 2012/0085008 A1 | 4/2012 | Breihof | |
| 2012/0314284 A1* | 12/2012 | Howes | G03B 21/56 359/443 |
| 2014/0325821 A1* | 11/2014 | Redmon | G03B 21/58 29/428 |

OTHER PUBLICATIONS

International Search Report for Application No. PCT/US2017/017738, dated May 31, 2017 (3 pgs).
Written Opinion for Application No. PCT/US2017/017738, dated May 31, 2017 (8 pgs).
Extended European Search Report for Application No. 17750990.8, dated Aug. 12, 2019 (7 pgs).

\* cited by examiner

FOLDING PROJECTION SCREEN

RELATED APPLICATION

The present application is a National Phase entry of PCT Application No. PCT/US2017/017738, filed Feb. 13, 2017, which claims priority to U.S. Provisional Application No. 62/294,260, filed Feb. 11, 2016, said applications being hereby incorporated herein by reference in their entirety.

FIELD OF THE INVENTION

The present invention relates to projection screens, and more specifically to portable projection screens.

BACKGROUND OF THE INVENTION

Projection screens that can be broken down and transported between locations where it may be desirable to display projected images for an audience, are known. A drawback of prior such portable projection screens, however, is that, depending on the size of the screen, the components can be cumbersome to store and transport. Further, assembly of the components can require considerable skill and effort to assemble, and if the screen is a flexible cloth-like material, it can be challenging to deploy the screen so that the display surface is flat without wrinkles or other such defects that can detract from the projected image.

What is needed is a portable projection screen that can be broken down into components for easy transport and storage, while also being relatively easy to assemble into a self-supporting display screen with a flat surface without distracting wrinkles or other defects.

SUMMARY OF THE INVENTION

A portable display screen according to the present invention addresses the need of the industry for a portable projection screen that can be broken down into components for easy transport and storage, while also being relatively easy to assemble into a self-supporting display screen with a flat surface without distracting wrinkles or other defects.

In an embodiment, a folding projection screen assembly includes a pair of spaced apart leg assemblies, and a frame assembly coupled between the spaced apart leg assemblies. The frame assembly includes a plurality of members, each of the members defining at least one generally c-shaped channel. A screen assembly is attached to the frame assembly, the screen assembly including a flexible screen material presenting a plurality of edges, a plurality of clips arranged along each edge of the flexible screen material, each of the clips having a channel engagement body portion and a screen engagement portion, the channel engagement body portion being selectively engageable in the generally c-shaped channels of the members of the frame assembly to secure the screen to the frame assembly so that the flexible screen of the screen assembly presents a substantially flat projection surface.

In embodiments of the invention, the frame assembly can include a plurality of corner assemblies, and a plurality of rails coupling the corner assemblies. The corner assemblies can be coupled together with a hinge assembly, and the hinge assembly can be slidably disposed in a rail of one of the corner assemblies.

In embodiments of the invention, the channel engagement body portion of each clip has a toe portion and an opposing latching portion, the toe portion engagable in a first recess defined by the c-shaped channels of the members of the frame assembly, and the opposing latching portion engageable in an opposing second recess defined by the c-shaped channels of the members of the frame assembly so as to secure the clip within the c-shaped channel. The at least one c-shaped channel of each member of the screen assembly can face in a direction parallel to the plane of the attached flexible screen material.

In embodiments of the invention each one of the pair of leg assemblies may include a lower leg assembly and a middle leg assembly. Each middle leg assembly may include a guide rail and at least one frame attachment assembly on the guide rail, the frame attachment assemblies coupling the frame assembly to the leg assemblies. The at least one frame attachment assembly can be selectively slidable on the guide rail to adjust a vertical position of the screen assembly. The guide rail may be marked with indicia to aid in positioning of the at least one frame attachment assembly on the guide rail. Each lower leg assembly may include a column and a pair of feet attached to the column. The pair of feet may be pivotally coupled to the column.

In other embodiments, a projection screen assembly includes a frame assembly including a plurality of members, each of the members defining at least one generally c-shaped channel; and a screen assembly attached to the frame assembly. The screen assembly includes a flexible screen material presenting a plurality of edges, a plurality of clips arranged along each edge of the flexible screen material, with each of the clips having a channel engagement body portion. The channel engagement body portion is selectively engageable in the generally c-shaped channels of the members of the frame assembly to secure the screen to the frame assembly so that the flexible screen of the screen assembly presents a substantially flat projection surface.

The frame assembly can include a plurality of corner assemblies, and a plurality of rails coupling the corner assemblies, and a pair of the corner assemblies may be coupled together with a hinge assembly.

In embodiments, the channel engagement body portion of each clip has a toe portion and an opposing latching portion, the toe portion engagable in a first recess defined by the c-shaped channels of the members of the frame assembly, and the opposing latching portion engageable in an opposing second recess defined by the c-shaped channels of the members of the frame assembly so as to secure the clip within the c-shaped channel. The projection screen assembly may further include a pair of leg assemblies coupled to the frame assembly.

BRIEF DESCRIPTION OF THE DRAWINGS

The embodiments of the present invention may be more completely understood in consideration of the following detailed description of various embodiments in connection with the accompanying drawings, in which.

Figure 1:
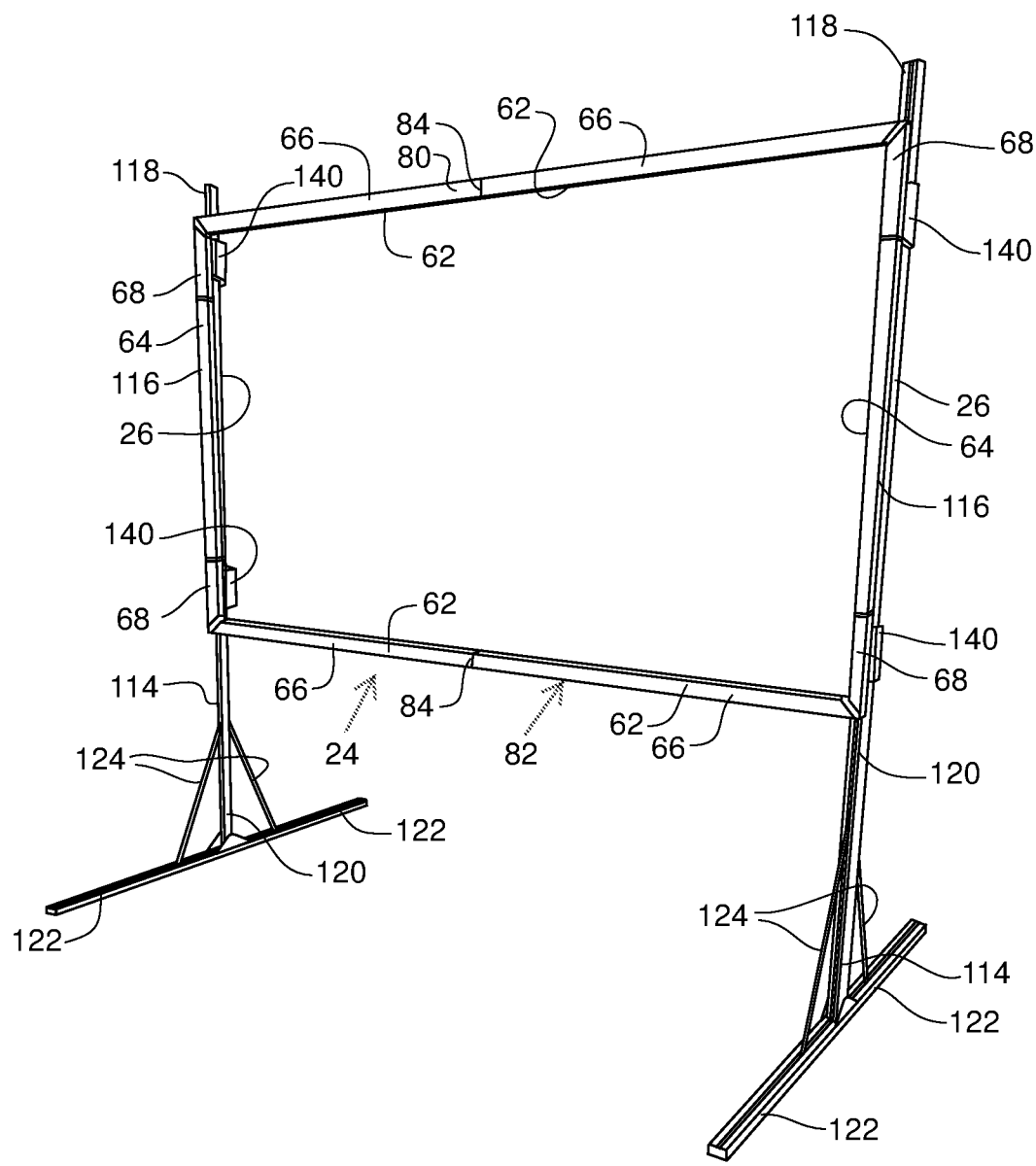
FIG. 1 is a front perspective view of a folding projection screen according to an embodiment of the invention, with the screen material omitted.

While the present invention is amenable to various modifications and alternative forms, specifics thereof have been shown by way of example in the drawings and will be described in detail. It should be understood, however, that the intention is not to limit the present invention to the particular embodiments described. On the contrary, the intention is to cover all modifications, equivalents, and alternatives falling within the spirit and scope of the present invention.

DETAILED DESCRIPTION

Figure 1A:
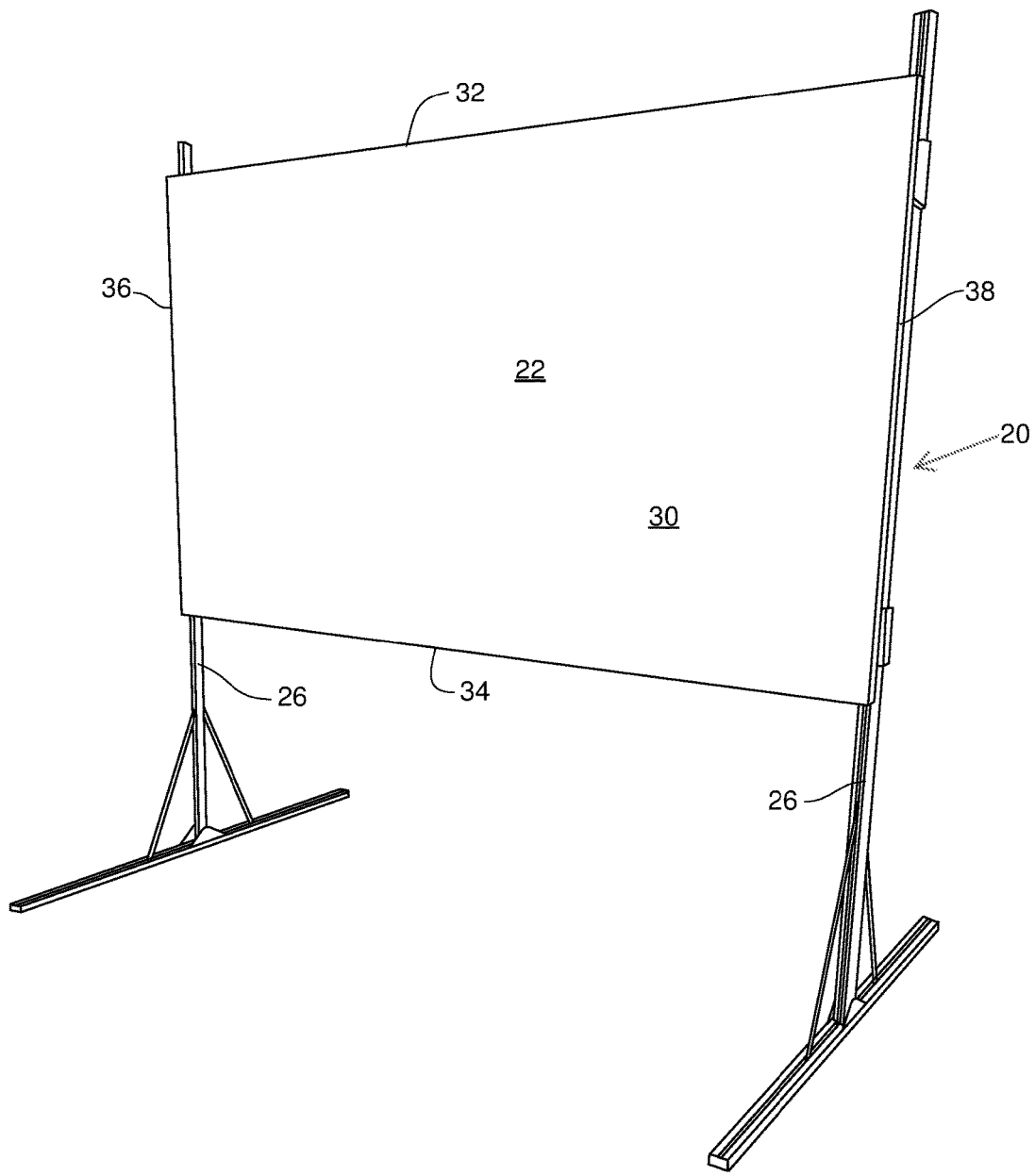
FIG. 1*a* is front perspective view of the folding projection screen of FIG. 1 with the screen material attached.

In FIGS. 1-19 there is depicted a folding projection screen 20 according to an embodiment of the invention. As depicted in FIGS. 1 and 1a, projection screen 20 generally includes fabric screen 22, frame assembly 24, and leg assemblies 26. Fabric screen 22 generally includes a sheet of cloth-like projection screen material 28 as is known in the art. Screen 22 presents a surface 30 having desirable characteristics for displaying an image projected from a projector (not depicted), and has top margin 32, bottom margin 34, and side margins 36, 38. Screen clips 40 are attached to, and spaced apart on, top margin 32, bottom margin 34, and side margins 36, 38, of screen 22 as depicted in exemplary fashion in FIG. 11 to enable screen 22 to be attached to frame assembly 24.

Figure 5:
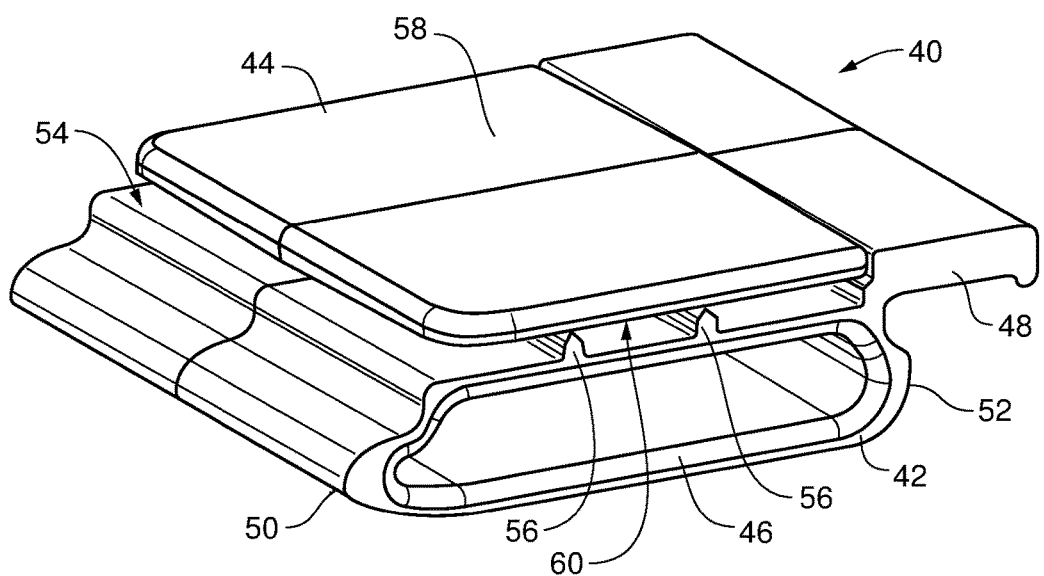
FIG. 5 is an isometric view of a screen clip according to an embodiment of the invention.
Figure 6:
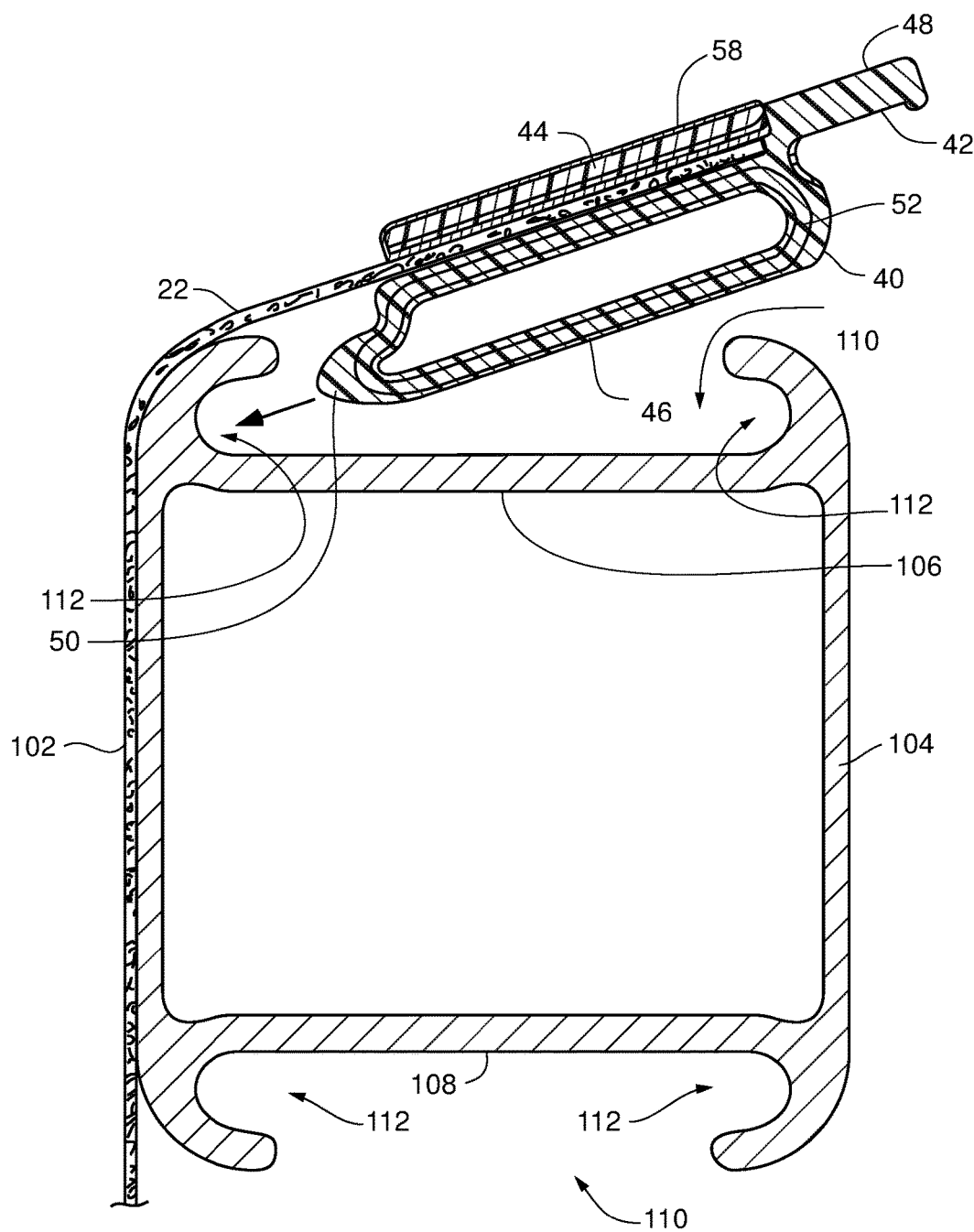
FIG. 6 is a cross-sectional view depicting the screen clip of FIG. 5 in an initial stage of being engaged with the frame element of FIG. 2.
Figure 7:
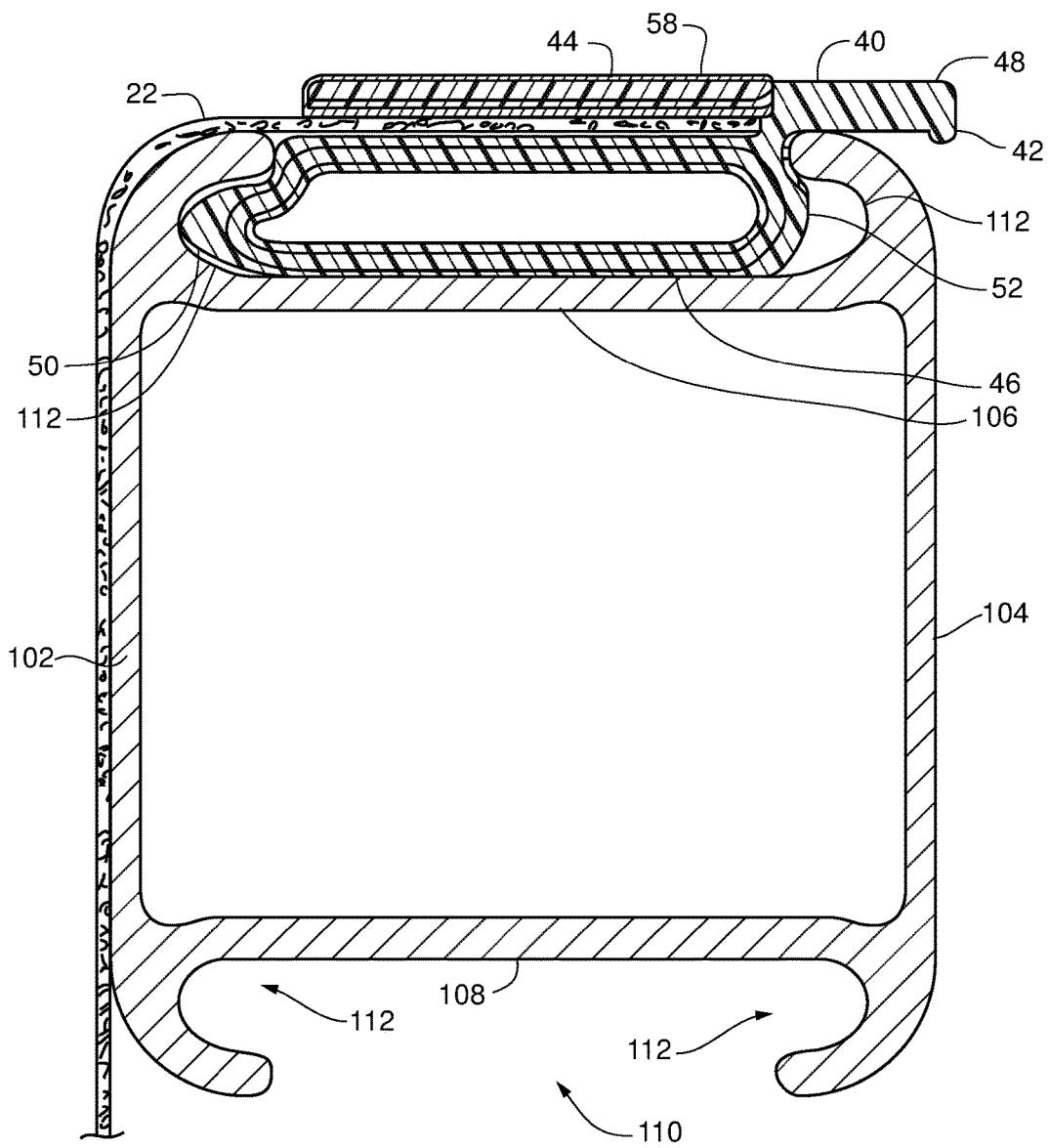
FIG. 7 is a cross-sectional view depicting the screen clip of FIG. 5 fully engaged with the frame element of FIG. 2.
Figure 21:
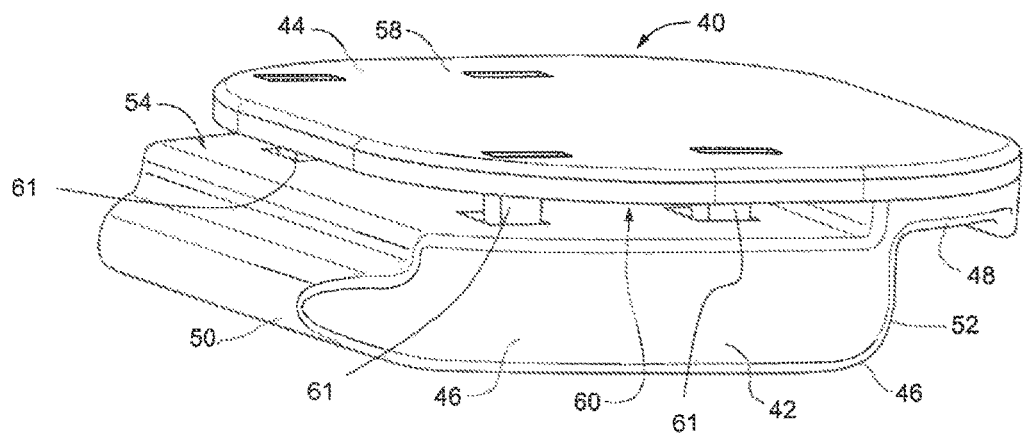
FIG. 21 is an isometric view of an alternative embodiment of a screen clip.

Each screen clip 40, as depicted in FIGS. 5-7, generally includes body portion 42 and screen securing portion 44. Body portion 42 generally includes channel engagement body 46 and tab 48. Channel engagement body 46 presents front toe 50 and rear latching portion 52. Upper surface 54 of channel engagement body 46 may present screen material gripping features 56. Securing portion 44 generally includes planar body 58, and may present one or more screen material gripping features (not depicted) projecting downwardly from lower surface 60. Alternatively, as depicted in FIG. 21, screen gripping features 61 may project downwardly from lower surface 60, and extend through fabric screen 22 to engage with structures (not depicted) in channel engagement body 46. In either case, fabric screen 22 is clamped between upper surface 54 of channel engagement body 46 and lower surface 60 of securing portion 44 so as to securely fix screen clip 40 to fabric screen 22. This connection may include the described mechanical connections, or may include suitable adhesives and/or thermal bonding as is known in the art so as to ensure that each screen clip 40 is securely and permanently attached to fabric screen 22.

Figure 3:
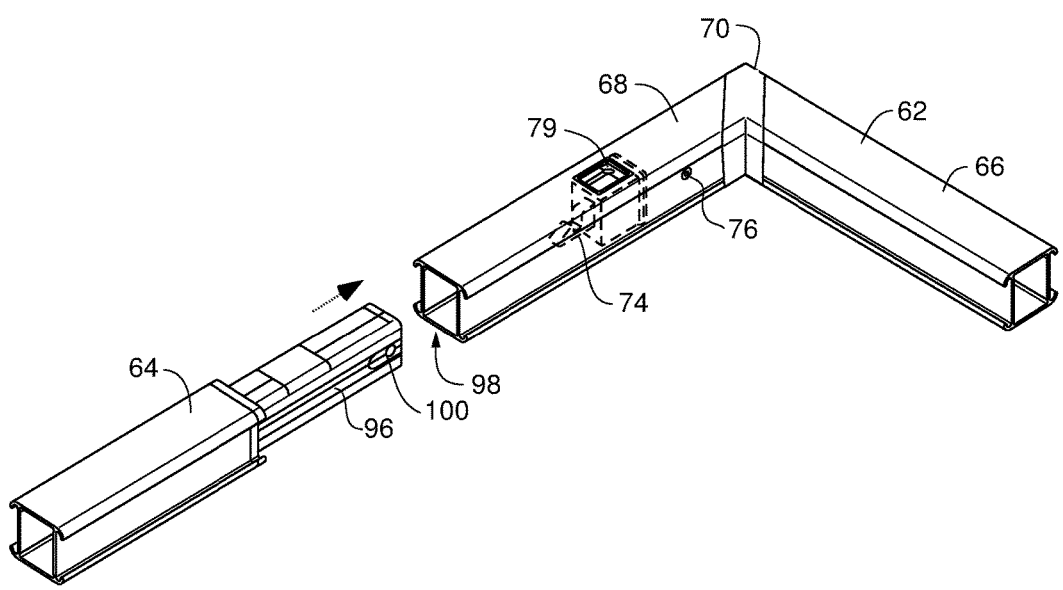
FIG. 3 is an exploded view of a corner portion of the frame of the screen of FIG. 1, depicting the connection between a side rail and a corner/top rail element.
Figure 4:
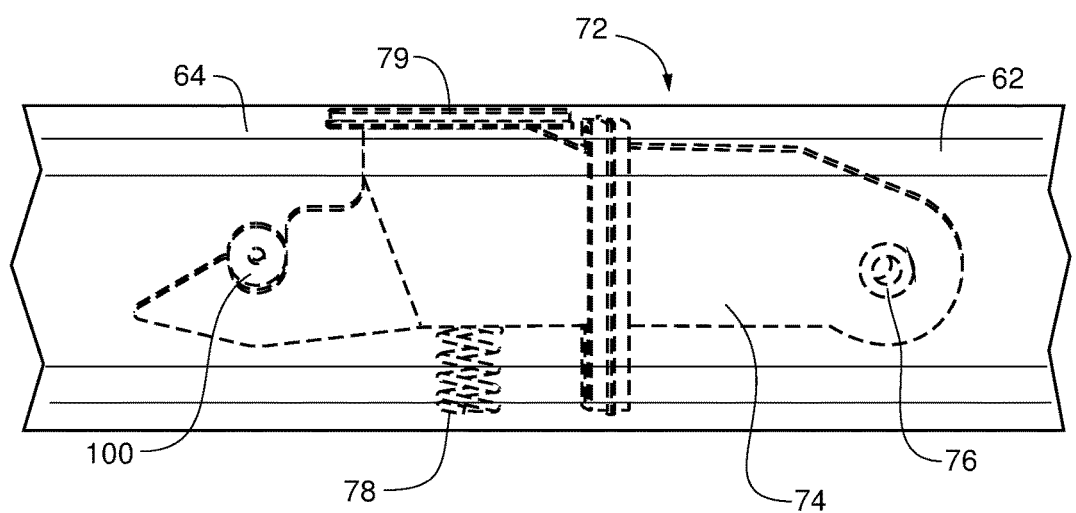
FIG. 4 is a phantom view of the spring latch connection between the side rail and the corner/top rail element depicted in FIG. 3.

Frame assembly 24 generally includes corner assemblies 62 and side rails 64. As depicted in FIGS. 1 and 3, each of corner assemblies 62 generally includes long rail 66 and short rail 68, joined at corner 70. Short rail 68 is hollow with latch assembly 72 disposed therein as depicted in FIGS. 3 and 4. Latch assembly 72 generally includes latch member 74 pivotally coupled to short rail 68 at pivot pin 76, and biasing spring 78. Push button 79 can be provided for actuating latch member 74. Adjacent corner assemblies 62 along top side 80 of frame assembly 24, and adjacent corner assemblies 62 along bottom side 82 of frame assembly 24, respectively may be hinged together at connections 84 as depicted in FIGS. 1 and 8-10. At each connection 84, one of long rails 66 includes extension portion 86 fixed therein, and the other long rail 66 defines a hollow bore and slidably receives the extension portion 86 of the other long rail 66 in its hollow bore. Extension portion 86 includes attachment portion 88 and hinged portion 90. It will be appreciated that hinged portion 90 may be permanently retained in the opposing one of long rails 66, or may be made selectively removable with a latching mechanism so as to enable the components to be further broken down for transport and storage.

Figure 20:
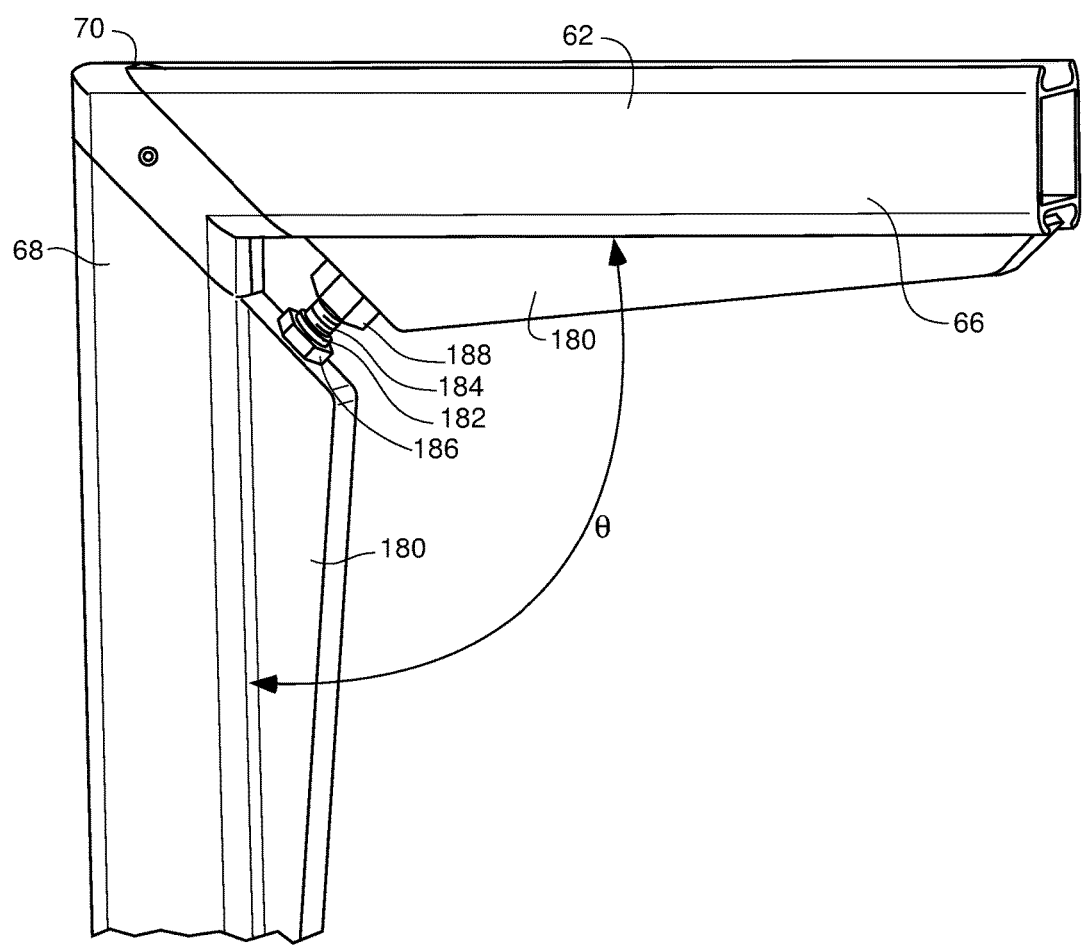
FIG. 20 is an elevation view of an alternative embodiment of a corner assembly.

An alternative embodiment of corner assemblies 62 is depicted in FIG. 20. In this embodiment, each of long rail 66 and short rail 68 has a gusset structure 180. Gusset structures 180 are tied together by adjustment mechanism 182 generally including bolt 184 and nuts 186, 188. It will be appreciated that, by manipulating nuts 186, 188, the angle Θ between long rail 66 and short rail 68 can be altered if necessary to smooth out wrinkles in screen 22. Also, gusset structures 180 and adjustment mechanism 182 can add additional stiffness to corner assemblies 62.

Figure 8:
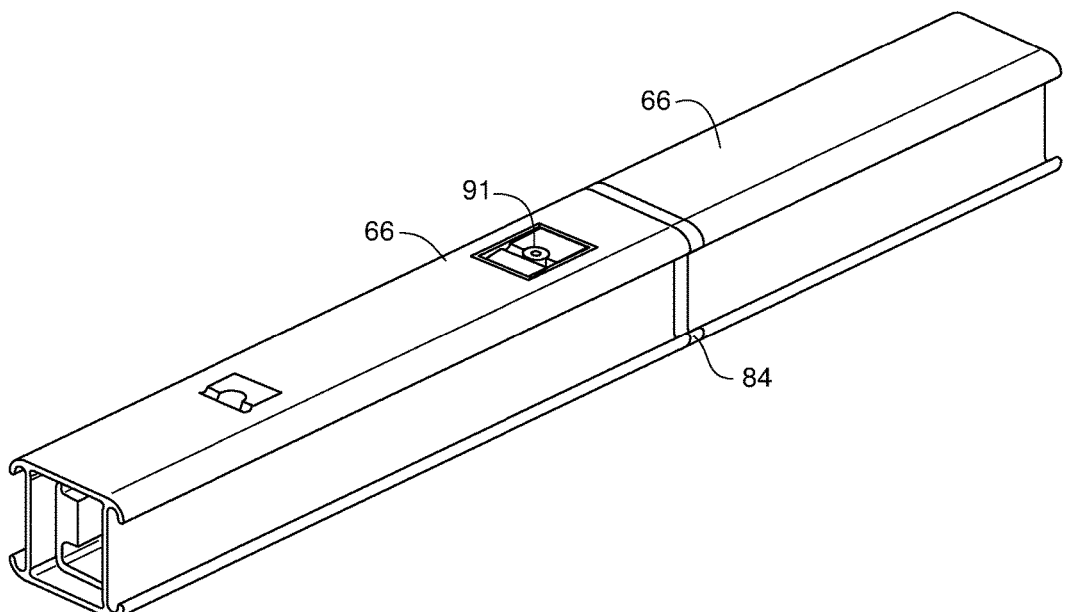
FIG. 8 is an isometric view of a hinge portion of the frame of FIG. 1, with the hinge portion shown in a closed orientation.
Figure 9:
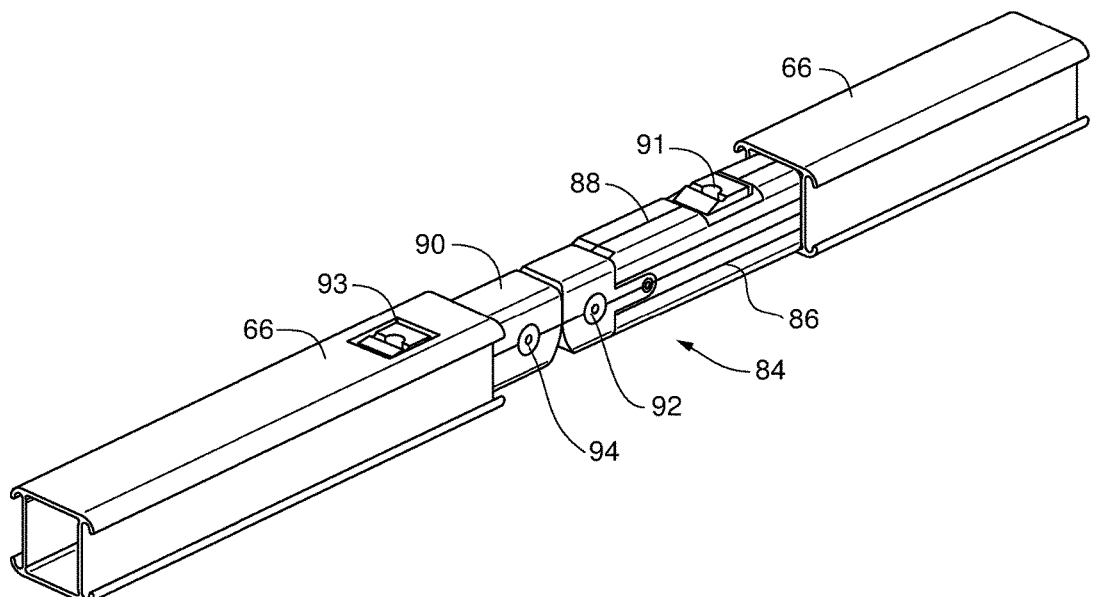
FIG. 9 is an isometric view of a hinge portion of the frame of FIG. 1, with the hinge portion shown in an open orientation so as to enable operation of the hinge.
Figure 10:
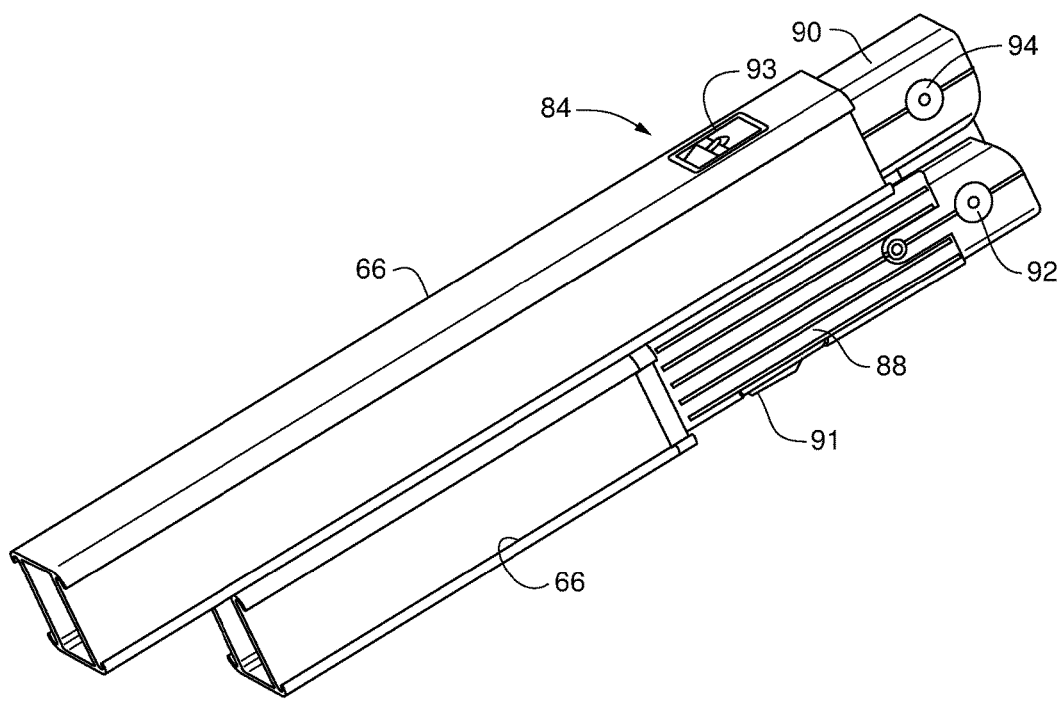
FIG. 10 is an isometric view of a hinge portion of the frame of FIG. 1, with the hinge portion shown in a folded orientation.
Figure 11:
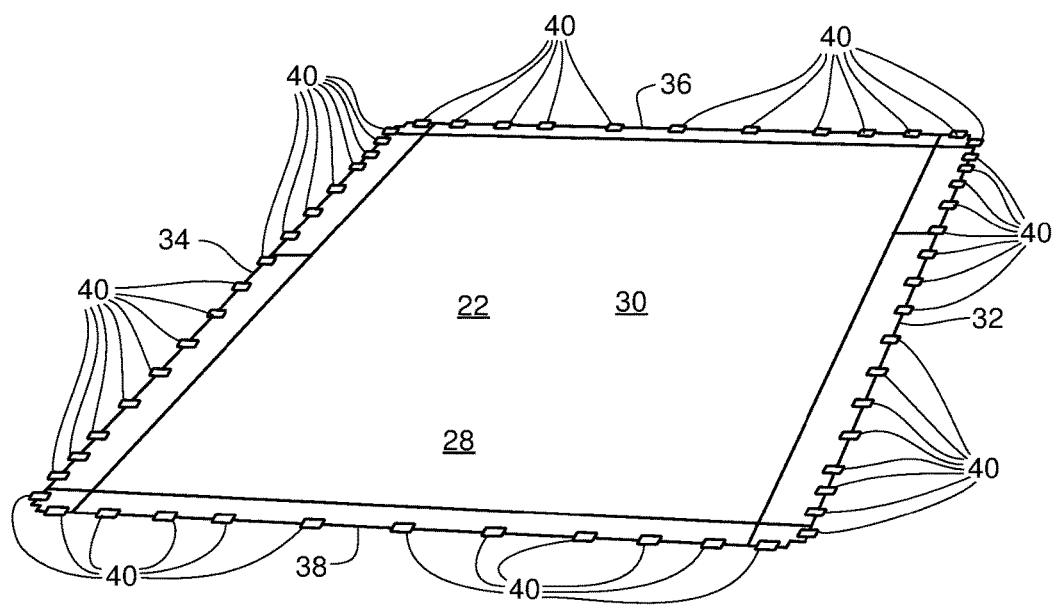
FIG. 11 depicts the clips of FIG. 5 attached to screen material.

Push button latch 91 is provided to engage engagement portion 93 when the assembly is in the closed position as depicted in FIG. 8. Attachment portion 88 and hinged portion 90 are separately coupled to a hinge plate (not depicted) at hinge pins 92, 94, respectively, enabling the adjacent corner assemblies to be folded as depicted in FIG. 10. Both ends of each side rail 64 have an extension portion 96 that is receivable in the bore 98 defined by short rail 68 of corner assemblies 62 as depicted in FIG. 3. Extension portion 96 carries engagement pin 100.

Figure 2:
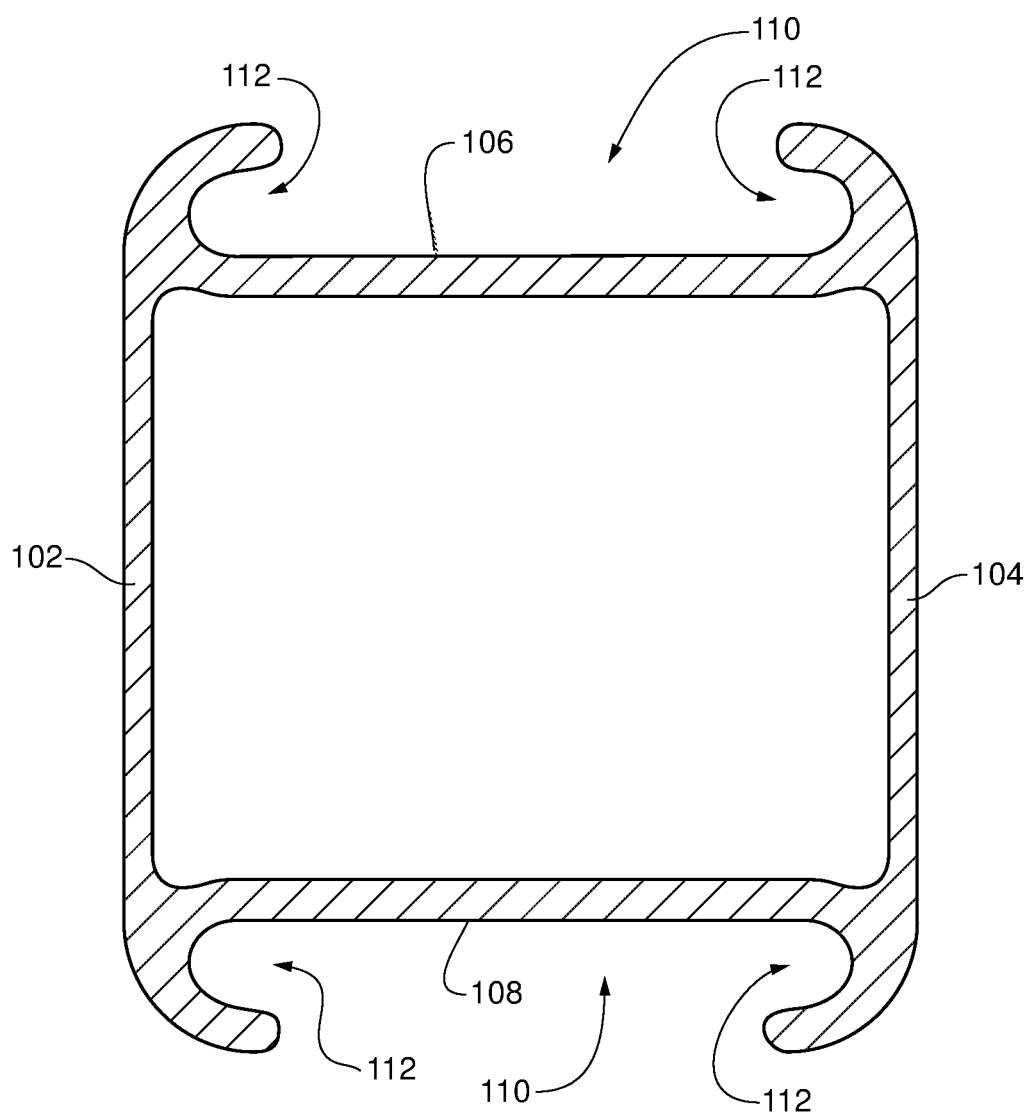
FIG. 2 is a cross-sectional view of an element of the frame of the screen of FIG. 1 taken at section 2-2 of FIG. 1.

Each of side rails 64, long rails 66, and short rails 68, can have an identical cross-sectional profile as depicted in FIGS. 2, 6 and 7, including sides 102, 104, and adjacent sides 106, 108. Sides 106, 108, define generally c-shaped channels 110 with opposing recesses 112, 113.

Figure 12:
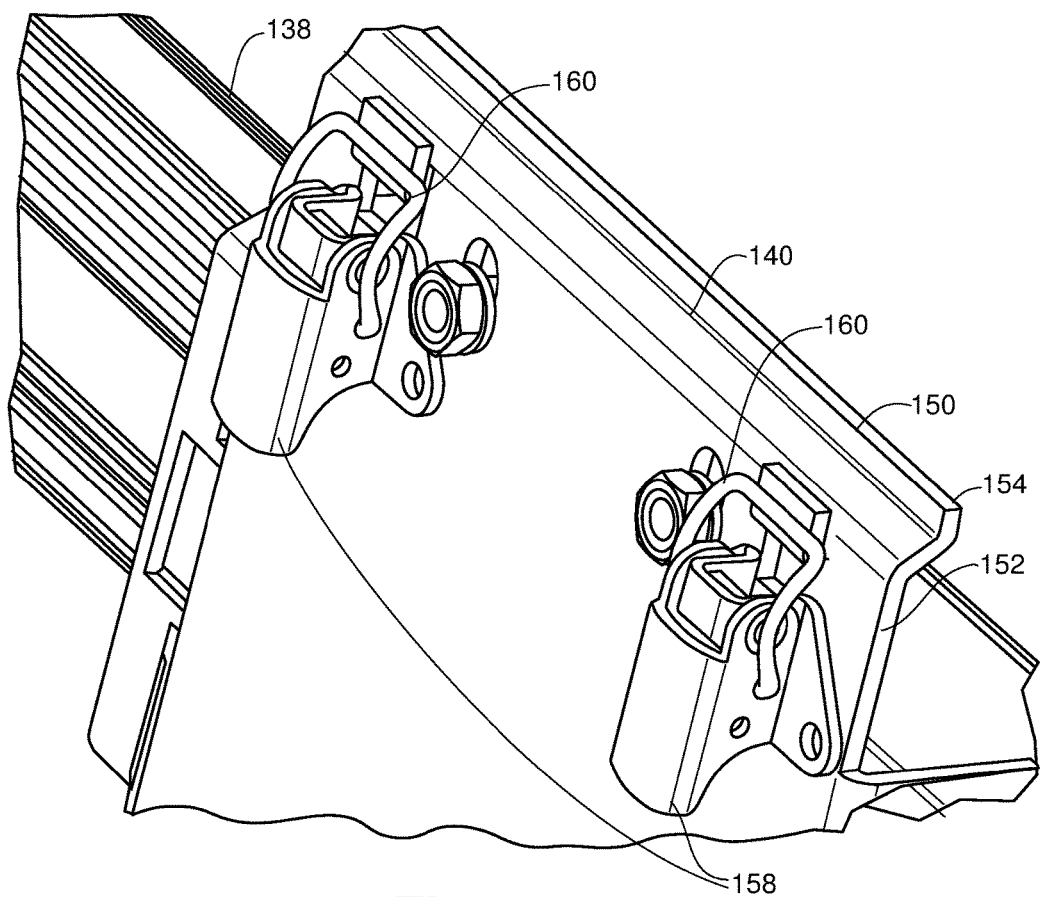
FIG. 12 is an isometric view of the rear side of a clamp for attaching the leg assemblies of the folding projection screen of FIG. 1 to the frame assembly.
Figure 13:
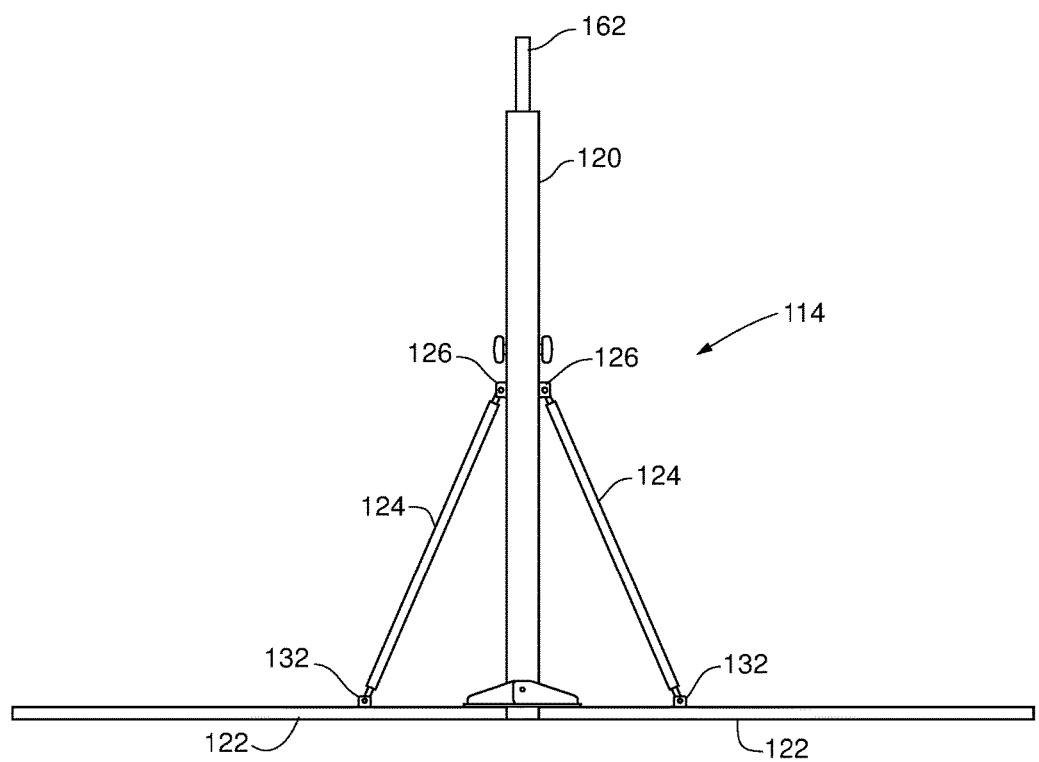
FIG. 13 is an isometric view of the lower portion of a leg assembly of the folding projection screen of FIG. 1.
Figure 14:
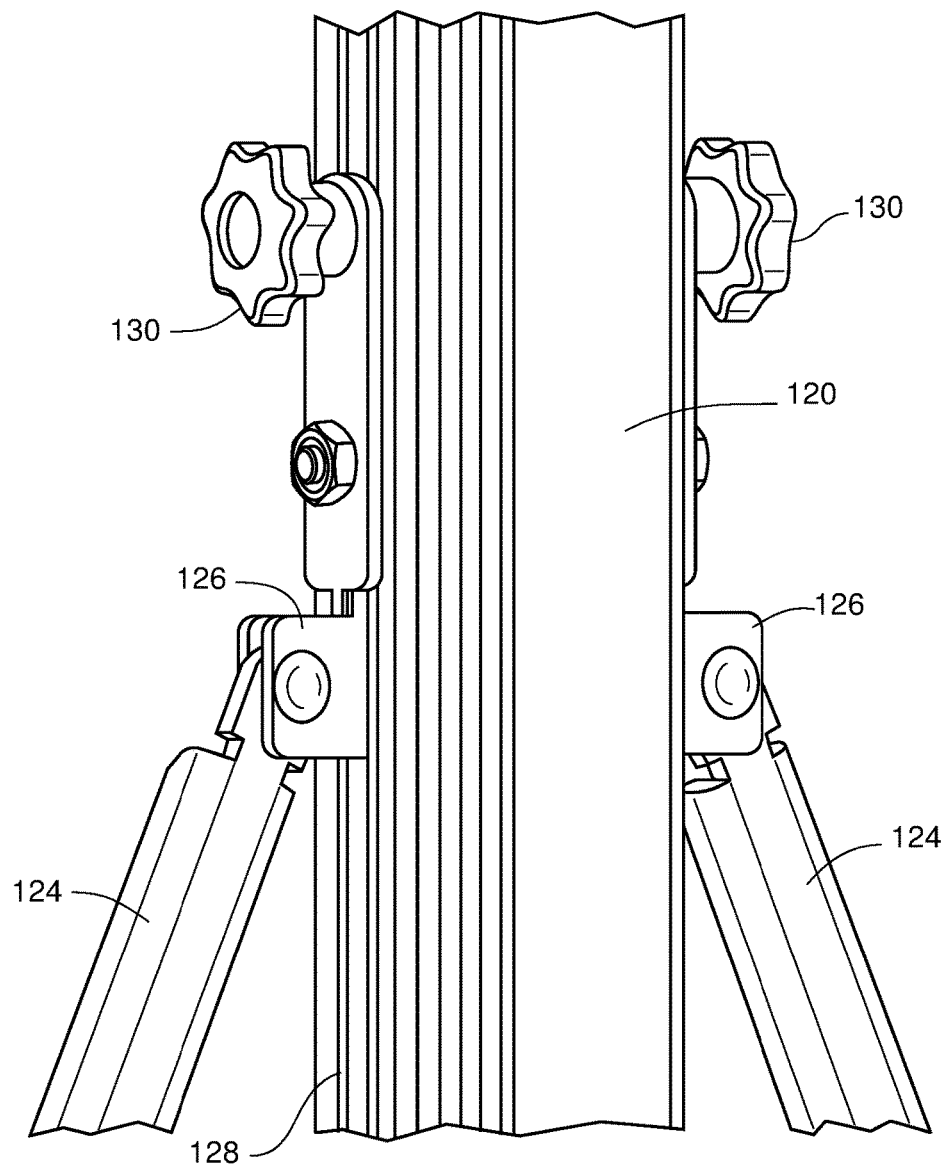
FIG. 14 is an isometric view of the attachment of the stay braces to the main column in the leg assembly of FIG. 13.
Figure 15:
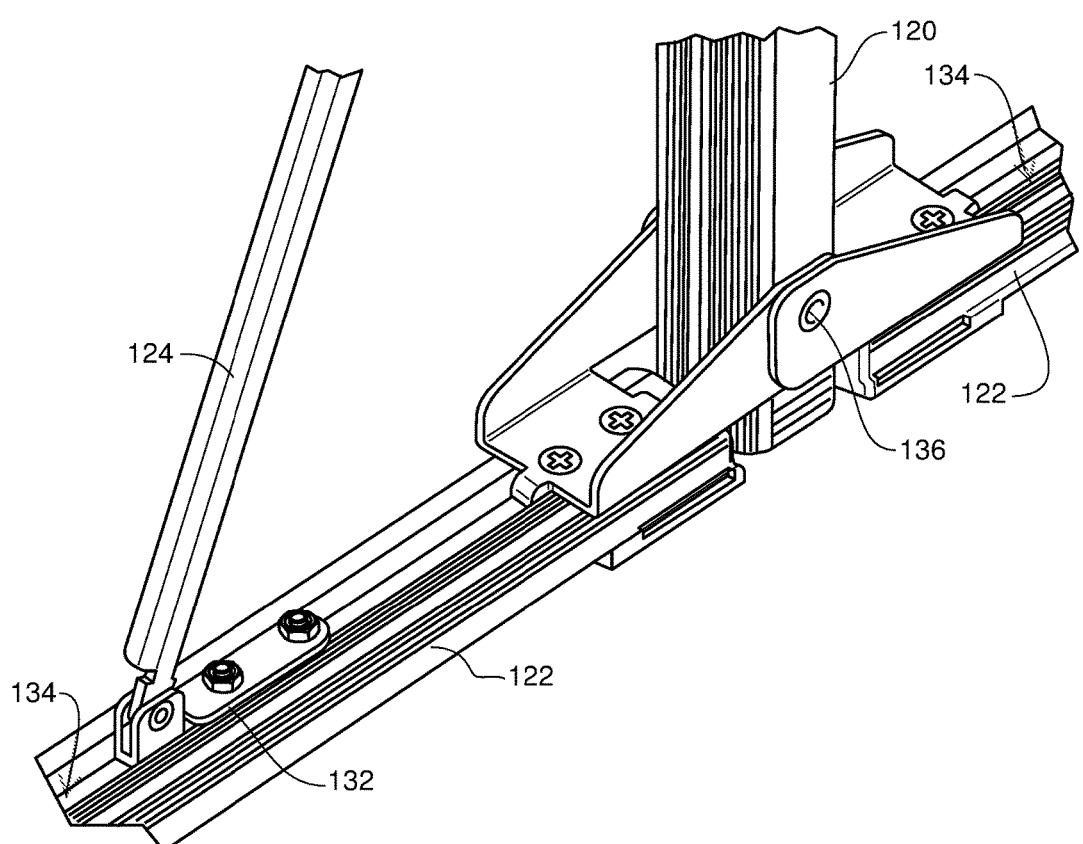
FIG. 15 is an isometric view of the hinge and stay brace attachment between the main column and the feet of the leg assembly of FIG. 13.
Figure 16:
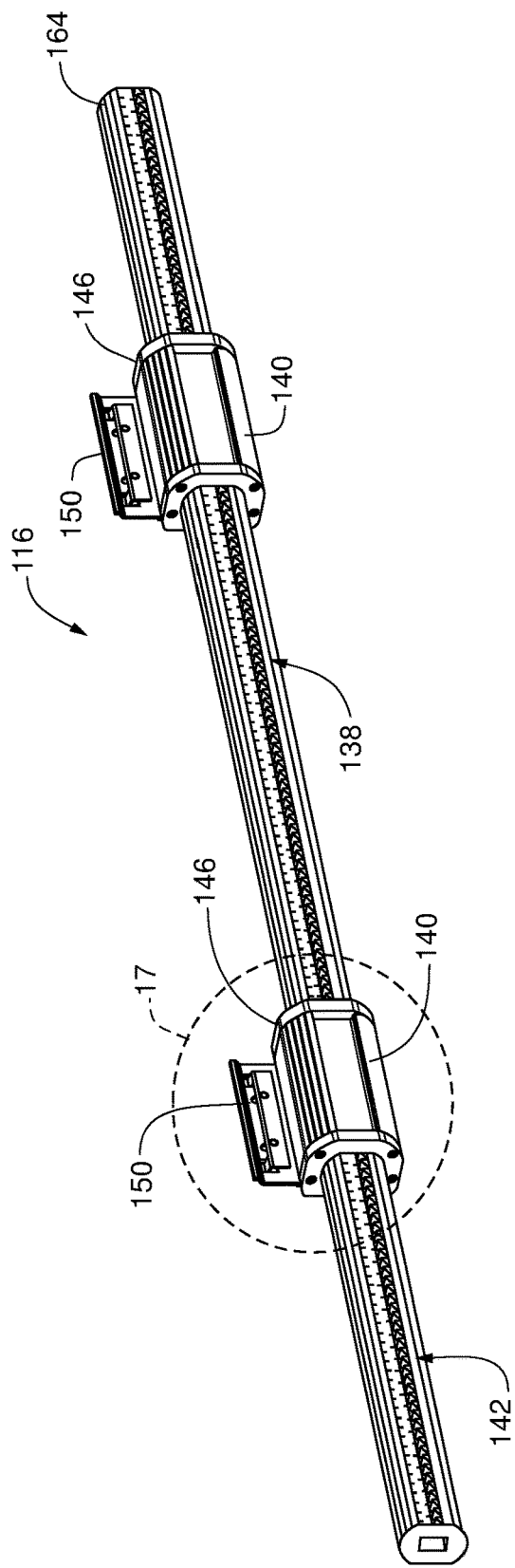
FIG. 16 is an isometric view of the middle portion of the leg assembly of FIG. 13.

Each leg assembly 26 as depicted in FIGS. 1, and 12-19 generally includes lower leg assembly 114, middle leg assembly 116, and upper leg assembly 118. Lower leg assembly 114 generally includes column 120, feet 122, and stay braces 124. As depicted in FIG. 14, stay braces 124 are coupled to column 120 with a pivoting connector 126 that is slidably received in channel 128 defined in column 120. Friction adjustment mechanism 130 is provided to selectively fix pivoting connector 126 in a desired location along channel 128. Similarly, as depicted in FIG. 15, pivoting connectors 132 are coupled to an opposing end of each stay brace 124, and are slidably received in channel 134 defined in each of feet 122. Feet 122 are pivotally coupled to column 120 at pivot pin 136.

Figure 17:
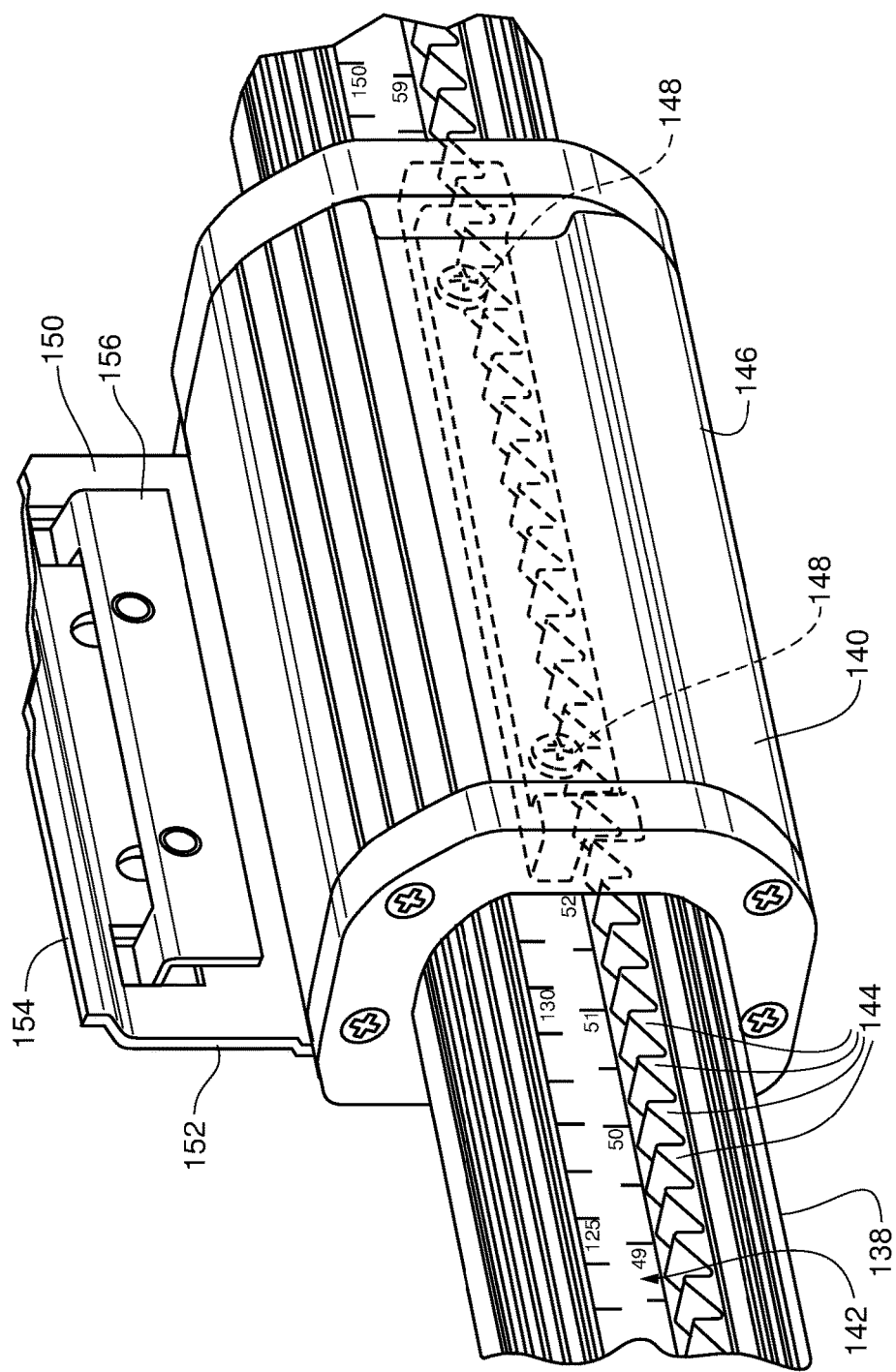
FIG. 17 is a phantom view of the frame connector of the middle portion of the leg assembly depicted in FIG. 16.
Figure 18:
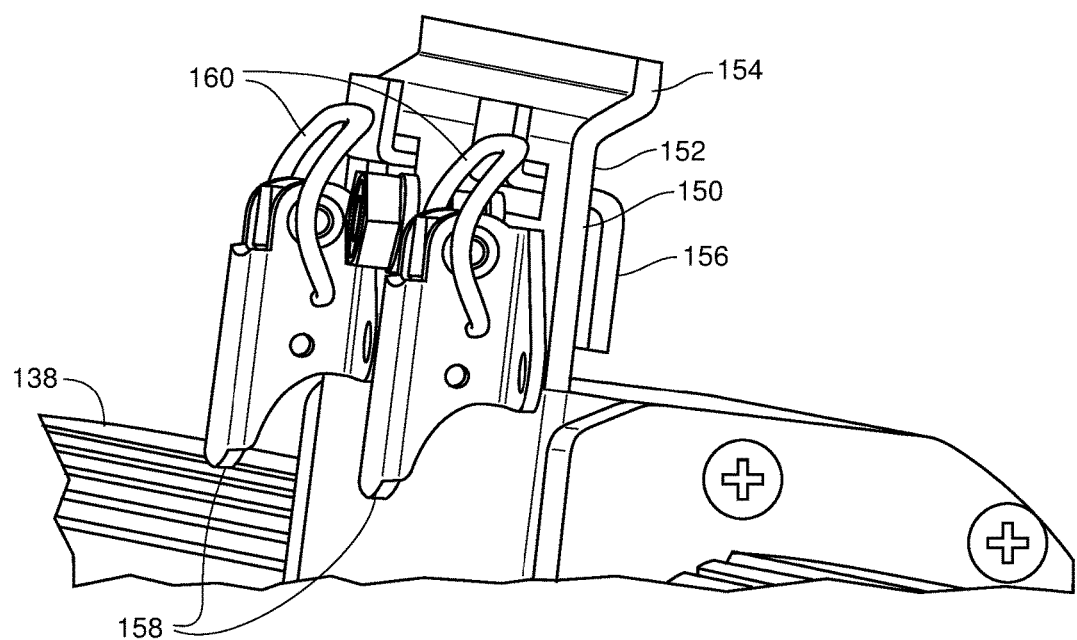
FIG. 18 is an isometric view of the latch assembly of the frame connector depicted in FIG. 17.
Figure 19:
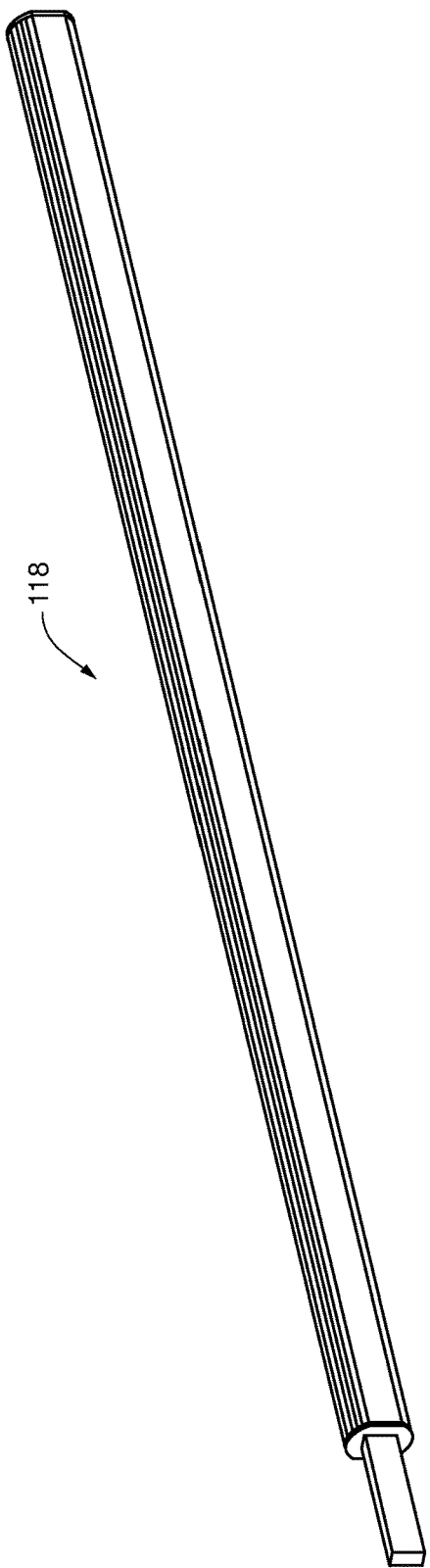
FIG. 19 is an isometric view of the top portion of the leg assembly.
Figure 22:
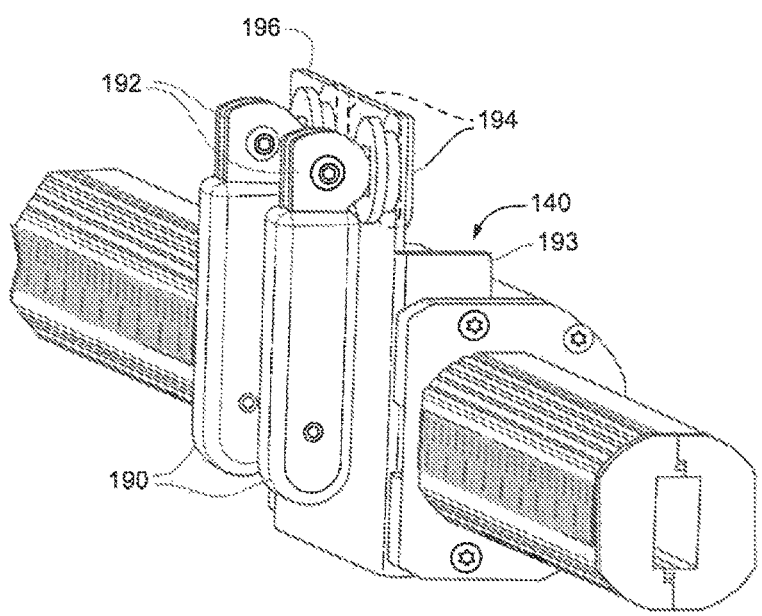
FIG. 22 is an isometric view of an alternative embodiment of a clamp for attaching the leg assemblies to the frame assembly.

Middle leg assembly 116 as depicted in FIGS. 1, 12, and 16-18, generally includes guide rail 138 and screen frame attachment assemblies 140. Guide rail 138 defines channel 142 having inwardly facing teeth 144. Frame attachment assemblies 140 generally include guide portion 146 slidably receiving guide rail 138. Each of the frame attachment assemblies 140 may have a ratchet mechanism 148 to selectively engage with teeth 144 to enable the frame attachment assemblies to be selectively positioned at any location along guide rail 138. Indicia (such as lengths in metric or English units) may be provided as depicted in FIGS. 17 and 22 to enable precise location of the frame attachment assemblies along guide rail 138. Frame attachment assembly 140 further includes frame attachment mechanism 150, generally including plate 152 presenting tab 154, latching tab 156, and finger controls 158 coupled so as to slide latching tab 156, and being spring biased with springs 160.

In an alternative embodiment depicted in FIG. 22, frame attachment assembly 140 may include finger controls 190 having cam surface 192, plate 193, pressure pads 194, and tab 196.

In use, projection screen 20 can be stored or transported in a condition wherein the lower leg assemblies 114, middle leg assemblies 116, and upper leg assemblies 118 are separated from each other, with feet 122 of lower leg assembly folded so as to be adjacent column 120. Similarly, frame assembly 24 can be in a disassembled condition, with corner assemblies 62 folded at the hinges as depicted in FIG. 10, and the side rails 64 separated from the corner assemblies 62. Screen 22 can be rolled or folded.

Assembly of projection screen 20 can proceed by folding feet 122 of each lower leg assembly 114 away from column 120 as depicted in FIG. 13. Friction adjustment mechanisms 130 can be tightened to hold feet 122 in the desired position. Middle leg assemblies 116 can then be engaged with the upper ends 162 of lower leg assemblies, and in turn, upper leg assemblies 118 can be engaged with the upper ends 164 of middle leg assemblies 116.

Frame assembly 24 can be deployed by unfolding corner assemblies 62 so that long rails 66 are aligned and sliding the long rails 66 together as depicted in FIG. 8. Push button latch 91 engages in engagement portion 93 to hold the assembly in an extended position. Side rails 64 can then be engaged with short rails 68 by sliding extension portions 96 into place so that engagement pin 100 is engaged with latch member 74. With frame assembly 24 assembled, screen 22 can be attached by advancing the front toe 50 of each screen clip 40 into the recess 112 of one of channels 110 of long rails 66 and short rails 68 as depicted in FIG. 6. The rear end of the screen clip 40 can be depressed so as to engage rear latching portion 52 with the opposing recess 113 as depicted in FIG. 7. It will be appreciated that each of long rails 66 and short rails 68 can have channels 110 defined on opposing sides of the rail as depicted in FIG. 2, so as to ease fabrication and assembly. Moreover, when channels 110 are faced in a direction D parallel to the plane of fabric screen 22 as depicted in FIGS. 6 and 7, fabric screen 22 can fold over one of radiused edges 180 of side rails 64, long rails 66, and short rails 68, such that clips 40 are not visible from the projection side of fabric screen 22, and radiused edges 180 help to smooth out the screen surface.

With screen 22 attached to frame assembly 24, frame assembly 24 can be attached to middle leg portions 116 by advancing tab 154 into one of recesses 113 of channel 110 of the appropriate side rail 64 or short rail 68, with finger control 158 in a released position (extending outwardly). Finger control 158 can then be operated to the latched position as depicted in FIG. 12 so as to enable latching tab 156 to engage in the opposing recess 112 thereby securing the frame attachment assembly 140 to the leg assembly 26. With all the frame attachment assemblies 140 so coupled, frame 24 is coupled to the leg assemblies 26 as depicted in FIG. 1, and with screen 22 attached, the screen is fully deployed as depicted in FIG. 1*a*.

In the alternative embodiment of FIG. 22, frame attachment assembly is secured by advancing tab 196 into one of recesses 113 of channel 110 of the appropriate side rail 64 or short rail 68 and operating finger controls 190 to the latched position as depicted in FIG. 22, so that cam surface 192 presses pressure pads 194 against back wall 198 of channel 110.

The folding projection screen 20 can be disassembled for storage or transport by reversing the described process.

The foregoing descriptions present numerous specific details that provide a thorough understanding of various embodiments of the invention. It will be apparent to one skilled in the art that various embodiments, having been disclosed herein, may be practiced without some or all of these specific details. In other instances, components as are known to those of ordinary skill in the art have not been described in detail herein in order to avoid unnecessarily obscuring the present invention. It is to be understood that even though numerous characteristics and advantages of various embodiments are set forth in the foregoing description, together with details of the structure and function of various embodiments, this disclosure is illustrative only. Other embodiments may be constructed that nevertheless employ the principles and spirit of the present invention. Accordingly, this application is intended to cover any adaptations or variations of the invention.

For purposes of interpreting the claims for the present invention, it is expressly intended that the provisions of 35 U.S.C. § 112(f) are not to be invoked unless the specific terms "means for" or "step for" are recited in a claim.

What is claimed is:

1. A folding projection screen assembly, comprising:
   a pair of spaced apart leg assemblies;
   a frame assembly coupled between the spaced apart leg assemblies, the frame assembly comprising a plurality of members, each of the members defining at least one generally c-shaped channel; and a screen assembly attached to the frame assembly, the screen assembly including a flexible screen material presenting a plurality of edges, a plurality of clips arranged along each edge of the flexible screen material, each of the clips having a channel engagement body portion and a screen engagement portion, the channel engagement body portion being selectively engageable in the generally c-shaped channels of the members of the frame assembly to secure the screen to the frame assembly so that the flexible screen of the screen assembly presents a substantially flat projection surface, wherein the channel engagement body portion of each clip has a toe portion and an opposing latching portion, the toe portion engagable in a first recess defined by the c-shaped channels of the members of the frame assembly, and the opposing latching portion engageable with an opposing second recess defined by the c-shaped channels of the members of the frame assembly so as to secure the clip within the c-shaped channel.

2. The folding projection screen assembly of claim 1, wherein the frame assembly comprises a plurality of corner assemblies, and a plurality of rails coupling the corner assemblies.

3. The folding projection screen assembly of claim 2, wherein a pair of the corner assemblies are coupled together with a hinge assembly.

4. The folding projection screen assembly of claim 3, wherein the hinge assembly is slidably disposed in a rail of one of the corner assemblies.

5. The folding projection screen of claim 1, wherein the at least one c-shaped channel of each member of the screen assembly faces in a direction parallel to the plane of the attached flexible screen material.

6. The folding projection screen of claim 1, wherein each one of the pair of leg assemblies includes a lower leg assembly and a middle leg assembly.

7. The folding projection screen of claim 6, wherein each middle leg assembly includes a guide rail and at least one frame attachment assembly on the guide rail, the frame attachment assemblies coupling the frame assembly to the leg assemblies.

8. The folding projection screen of claim 7, wherein the at least one frame attachment assembly is selectively slidable on the guide rail to adjust a vertical position of the screen assembly.

9. The folding projection screen of claim 8, wherein the guide rail is marked with indicia to aid in positioning of the at least one frame attachment assembly on the guide rail.

10. The folding projection screen of claim 6, wherein each lower leg assembly includes a column and a pair of feet attached to the column.

11. The folding projection screen of claim 10, wherein the pair of feet are pivotally coupled to the column.

12. A folding projection screen assembly, comprising:
 a pair of spaced apart leg assemblies;
 a frame assembly coupled between the spaced apart leg assemblies, the frame assembly comprising a plurality of members, each of the members defining a pair of opposing channels; and
 a screen assembly attached to the frame assembly, the screen assembly including a flexible screen material presenting a plurality of edges; a plurality of clips arranged along each edge of the flexible screen material, each of the clips having a channel engagement body portion and a screen engagement portion, the channel engagement body portion being selectively engageable with the opposing channels of the members of the frame assembly to secure the screen to the frame assembly so that the flexible screen material presents a substantially flat projection surface, wherein the channel engagement body portion of each clip has a toe portion and an opposing latching portion, the toe portion engagable in a first recess defined by one of the opposing channels of the members of the frame assembly, and the opposing latching portion engageable with a second recess defined by the other one of the opposing channels of the members of the frame assembly.

13. The folding projection screen assembly of claim 12, wherein the frame assembly comprises a plurality of corner assemblies, and a plurality of rails coupling the corner assemblies.

14. The folding projection screen assembly of claim 13, wherein a pair of the corner assemblies are coupled together with a hinge assembly.

15. The folding projection screen assembly of claim 14, wherein the hinge assembly is slidably disposed in a rail of one of the corner assemblies.

* * * * *